I. M. ROSE.
PERCOLATOR.
APPLICATION FILED DEC. 12, 1916.
1,337,964.
Patented Apr. 20, 1920.
2 SHEETS—SHEET 1.
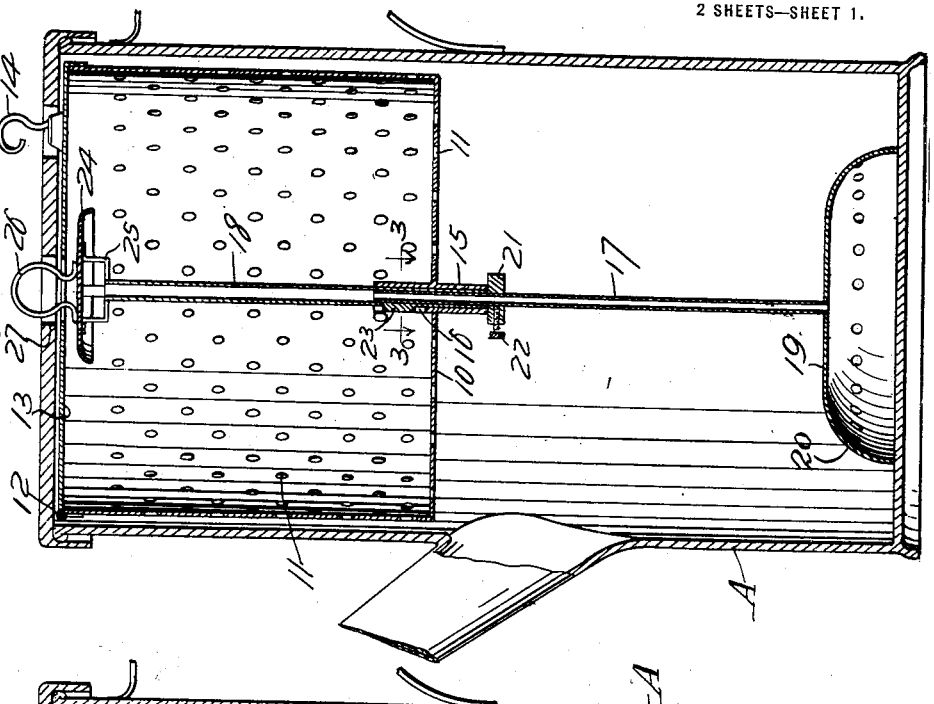
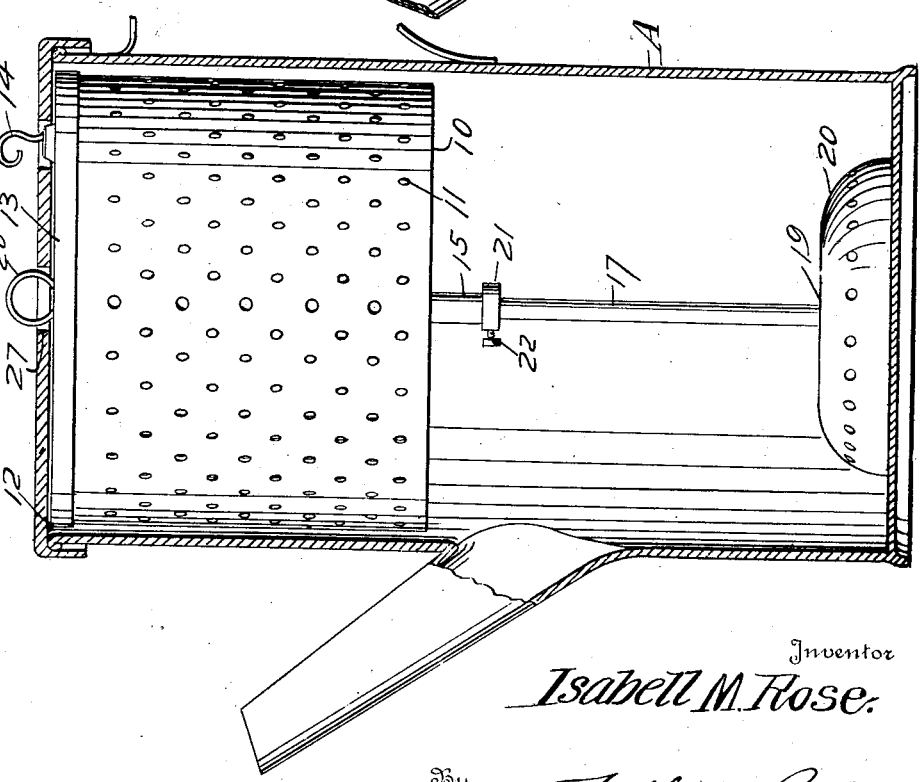
Inventor
Isabell M. Rose.
By Talbert H Parker
Attorneys

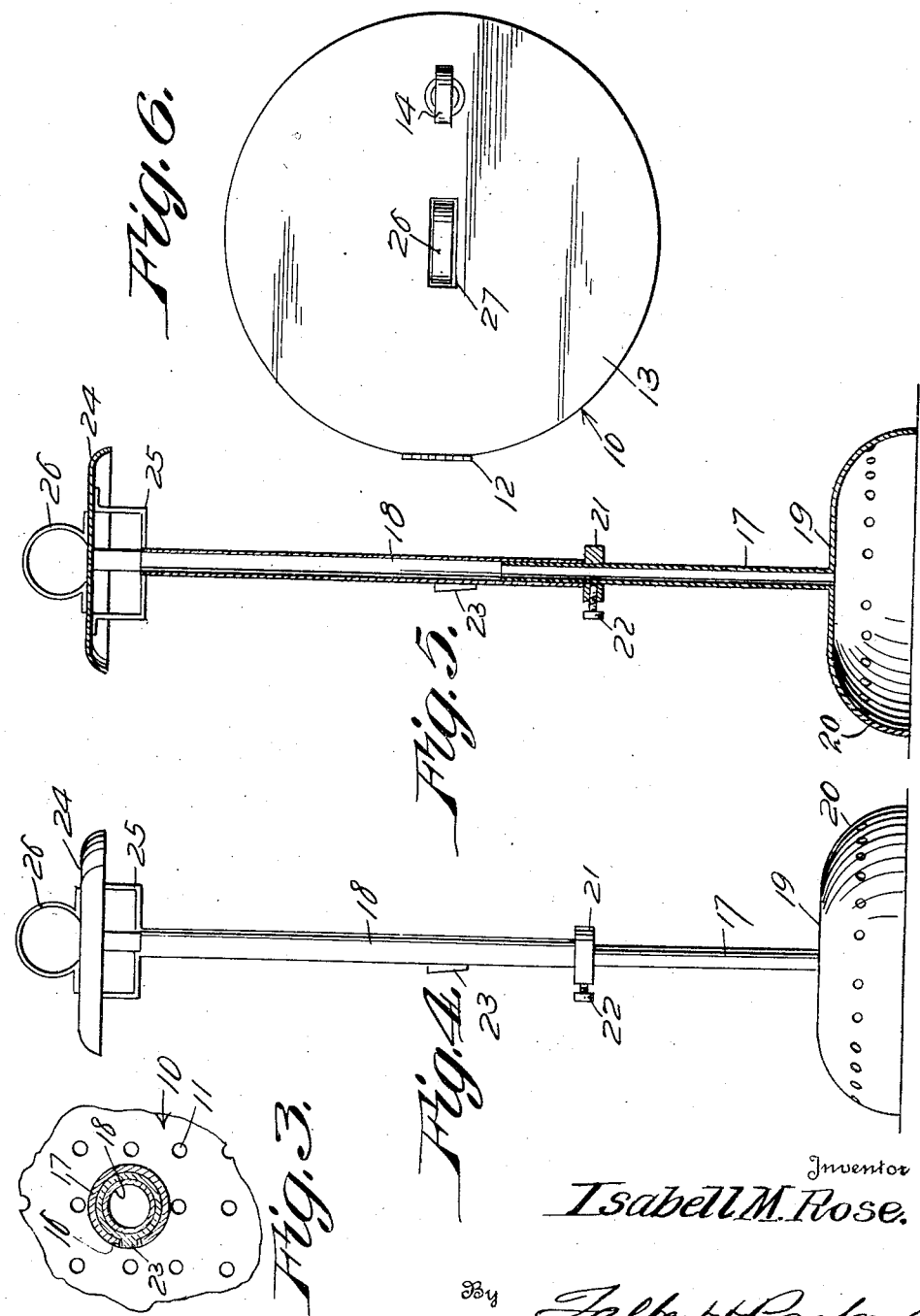

UNITED STATES PATENT OFFICE.

ISABELL M. ROSE, OF LEROY, TEXAS.

PERCOLATOR.

1,337,964.

Specification of Letters Patent.

Patented Apr. 20, 1920.

Application filed December 12, 1916. Serial No. 136,474.

*To all whom it may concern:*

Be it known that I, ISABELL M. ROSE, a citizen of the United States, residing at Leroy, in the county of McLennan and State of Texas, have invented certain useful Improvements in Percolators, of which the following is a specification, reference being had therein to the accompanying drawing.

The invention relates to percolators, and more particularly to the class of coffee or tea percolators.

The primary object of the invention is the provision of a percolator of this character wherein the coffee or tea can be conveniently placed therein without contact with the hot water contained within the coffee or tea pot and said percolator placed therein for the making of tea or coffee with despatch.

Another object of the invention is the provision of a percolator of this character wherein the same is readily adjustable so that it will fit within various sizes of pots without regard to the shape thereof and will percolate water through the quantity of coffee or tea when placed within the container so that the proper strength of the beverage will be had without possibility of scorching or burning the same during the process of making the beverage.

A further object of the invention is the provision of a percolator of this character wherein the construction thereof is novel in form so that the coffee or tea will be confined within the holder, yet the water will be free to circulate therethrough and thus eliminate possibility of the burning or scalding of the hand of the user when placing the coffee or tea within the percolator or in the removal of the latter from the pot.

A still further object of the invention is the provision of a percolator of this character which is simple in construction, assuring economy in the consumption of coffee or tea, thoroughly reliable and efficient in its operation, readily and easily adjusted to fit the various sizes of pots and also inexpensive in manufacture.

Other objects will be in part obvious and in part hereinafter set forth.

The invention accordingly consists in the features of construction, combination of elements and arrangement of parts which will be exemplified in the construction hereinafter set forth, and the scope of the invention of which will be indicated in the appended claims.

In the accompanying drawings:

Figure 1 is a vertical sectional view through a pot showing the percolator constructed in accordance with the invention therein;

Fig. 2 is a vertical longitudinal sectional view through the percolator;

Fig. 3 is a sectional view on the line 3—3 of Fig. 2;

Fig. 4 is a side elevation of the adjustable percolator tube removed from the container for the coffee or tea;

Fig. 5 is a vertical longitudinal sectional view thereof;

Fig. 6 is a top plan view of the container with the lid closed.

Similar reference characters indicate corresponding parts throughout the several views of the drawings.

Referring to the drawings in detail, A designates a portion of a pot ordinarily employed for the cooking of coffee or tea and may be of any ordinary well known construction, in which is arranged the percolator hereinafter fully described.

The percolator comprises a cylindrical body 10 which is in the form of a cup constituting a holder for the coffee or tea and has its bottom and side wall provided with a plurality of perforations 11 for the circulation of water therethrough in the cooking or making of the coffee or tea. Carried by the side wall of the body 10 is a hinge 12 swingingly supporting a cover or lid 13, the same being provided with a finger tab or hold 14 diametrically opposite the point of hinged connection thereof with the body 10 so that the lid or cover can be raised or lowered for the opening or closing of the container.

The bottom of the body 10, centrally thereof, is formed with a barrel 15 which protrudes within and without the said body, the inner protruding end being slit to form a slot 18 and removably passed through this barrel is the percolator staff hereinafter fully described.

The percolator staff comprises the tube sections 17 and 18, respectively, the latter being slidably telescoped upon the section 17, which has fixed or integrally formed therewith, spaced from its lowermost end, a spider constituting a base 19, the arms 20 thereof being outwardly and downwardly curved to constitute supporting legs for elevating the lowermost end of the tube 17 spaced from the bottom of the pot A when the percolator is positioned therein. Slidably fitted upon the tube section 17 is a bearing collar 21 carrying a set screw 22 which engages the tube section 17 for locking the collar in adjusted position thereon, and this collar constitutes a rest for the barrel 15 when fitted upon the tube section 18 and thereby holds the same against sliding movement downwardly upon the standard which supports the container elevated within the pot A. On mounting the container upon the standard, the barrel 15 is slipped upon the tube 18 which is formed with a key 23 correspondingly shaped to the slot 16 for locking engagement therein, thereby preventing relative turning movement between the container and the tube section 18. The tube 17 can be slidably adjusted in the tube 18 and the collar 21 will hold said tubes in their adjusted position, thereby increasing or decreasing the length of the standard so as to properly support the container in elevated position within the pot A according to the size of the pot.

The tube 18 of the standard, at its upper end, carries a beveled head or disk 24 which is supported upon arms 25 cut from the tube section 18 so as to hold the head or disk spaced from the upper end of said tube section 18 so that water, when boiling within the pot A, will enter the lower end of the tube section 17 and rise within the tube section 18 and thence be deflected by the head or disk 24 therefrom into the container for the circulation of the water within the contents of the body 10 of said container. The water, when percolating the contents of the container, will flow through the apertures or holes 11 in the wall and bottom thereof during the cooking process of the coffee or tea so that the full strength of the coffee or tea will be had without the accumulation of sediment or the mixing of the grounds of the coffee or leaves of the tea with the liquid constituting the beverage.

The head or disk 24 is formed with an eye 26 which protrudes through a slot 27 formed in the lid or cover 13 centrally thereof, and this eye 26 constitutes a hand-hold, as will be obvious, so that the percolator can be readily inserted within the pot or removed therefrom when the lid or cover is closed.

From the foregoing description, taken in connection with the accompanying drawings, the construction and manner of use of the herein described percolator will be readily understood and, therefore, a more extended explanation has been omitted.

Having thus described my invention, I claim:

1. In a device as described, in combination, a kettle, a lid thereon, a stand arranged upon the bottom of the kettle, a vertical tube secured upon said stand, a tube slidably mounted upon the first-named tube, a perforated vessel supporting said last-named tube and adjustable therewith, means for holding the adjusted tube and vessel against vertical displacement, a deflector plate carried by said slidable tube above its upper end, a loop handle carried by said deflector plate, said lid being formed with a slot through which said handle snugly projects whereby said tubes and stand are maintained in vertical position.

2. In a device as described, in combination, a kettle, a cover therefor, a stand disposed within the kettle and carrying an upstanding tubular member, an adjustable collar carried by said tubular member, a perforated vessel formed at its bottom with a centrally disposed barrel, a second tubular member telescoping the first and resting upon said collar, the said second tubular member passing through said barrel and being secured against turning movement with respect thereto, the second tubular member carrying at its upper end a loop handle, and a hingedly mounted cover carried by the perforated vessel, the last said cover and the cover for the kettle being provided with slots through which the loop handle projects.

In testimony whereof I affix my signature.

ISABELL M. ROSE.